(12) United States Patent
Chauvin et al.

(10) Patent No.: US 10,369,737 B2
(45) Date of Patent: Aug. 6, 2019

(54) METHOD AND APPARATUS FOR PACKAGING A LIQUID FOOD PRODUCT

(71) Applicant: DISCMA AG, Hunenberg (CH)

(72) Inventors: Guillaume Chauvin, Monthureux sur Saone (FR); Fabio Chimetto, Piazzola Sul Brenta (IT); Klaus Hartwig, Nancy (FR)

(73) Assignee: DISCMA AG, Zürich (CH)

( * ) Notice: Subject to any disclaimer, the term of this patent is extended or adjusted under 35 U.S.C. 154(b) by 0 days.

(21) Appl. No.: 15/399,346

(22) Filed: Jan. 5, 2017

(65) Prior Publication Data

US 2017/0113396 A1     Apr. 27, 2017

Related U.S. Application Data

(62) Division of application No. 13/002,199, filed as application No. PCT/EP2009/058236 on Jul. 1, 2009, now Pat. No. 9,573,314.

(30) Foreign Application Priority Data

Jul. 7, 2008 (EP) ..................... 08159852

(51) Int. Cl.
*B29C 49/46* (2006.01)
*B29C 49/12* (2006.01)
(Continued)

(52) U.S. Cl.
CPC .............. *B29C 49/46* (2013.01); *B29C 49/12* (2013.01); *B65B 3/022* (2013.01); *B65B 3/04* (2013.01); *B65B 3/12* (2013.01); *B29C 49/06* (2013.01); *B29C 49/78* (2013.01); *B29C 2049/1257* (2013.01); *B29C 2049/1271* (2013.01); *B29C 2049/4655* (2013.01);
(Continued)

(58) Field of Classification Search
CPC ....................................................... B29C 49/46
See application file for complete search history.

(56) References Cited

U.S. PATENT DOCUMENTS

| 7,473,388 B2 | 1/2009 | Desanaux et al. |
| 2008/0029928 A1* | 2/2008 | Andison ................. B29C 49/46 |
| | | 264/238 |

FOREIGN PATENT DOCUMENTS

| EP | 1529620 | 5/2005 |
| FR | 2830277 | 11/2003 |

(Continued)

*Primary Examiner* — Larry W Thrower
(74) *Attorney, Agent, or Firm* — Eric J. Sosenko; Jonathan P. O'Brien; Honigman LLP

(57) ABSTRACT

An apparatus for forming a thermoplastic container from a cylindrical preform and for delivering a predetermined volume of a beverage component into the container. The apparatus includes: a mold defining a shape of the container; a member configured to inject at least one beverage component into a recess in the preform so as to promote expansion of the preform inside the mold into the shape of the container, the member being further configured to inject the at least one beverage component in a first volume intentionally greater than the predetermined volume; and the member also being configured to remove a fraction of the first volume of the beverage component until a second volume of beverage component remaining in the container is equal to the predetermined volume.

14 Claims, 4 Drawing Sheets

(51) Int. Cl.
  *B65B 3/02* (2006.01)
  *B65B 3/04* (2006.01)
  *B65B 3/12* (2006.01)
  *B29C 49/06* (2006.01)
  *B29C 49/78* (2006.01)
  *B29K 23/00* (2006.01)
  *B29K 25/00* (2006.01)
  *B29K 27/06* (2006.01)
  *B29K 67/00* (2006.01)
  *B29K 69/00* (2006.01)
  *B29K 105/00* (2006.01)
  *B29L 31/00* (2006.01)

(52) U.S. Cl.
  CPC .. *B29C 2049/4664* (2013.01); *B29K 2023/06* (2013.01); *B29K 2023/12* (2013.01); *B29K 2025/00* (2013.01); *B29K 2027/06* (2013.01); *B29K 2067/00* (2013.01); *B29K 2067/003* (2013.01); *B29K 2067/046* (2013.01); *B29K 2069/00* (2013.01); *B29K 2105/258* (2013.01); *B29L 2031/7158* (2013.01)

(56) References Cited

FOREIGN PATENT DOCUMENTS

| | | | |
|---|---|---|---|
| GB | 1017122 | * | 1/1966 |
| JP | 06345191 | | 12/1994 |
| JP | 2000043129 | | 2/2000 |
| WO | 2005044540 | | 5/2005 |
| WO | 2006096916 | | 9/2006 |
| WO | 2007120807 | | 10/2007 |

* cited by examiner

METHOD AND APPARATUS FOR PACKAGING A LIQUID FOOD PRODUCT

CROSS-REFERENCE TO RELATED APPLICATIONS

This application is a divisional of U.S. application Ser. No. 13/002,199, which is a U.S. national phase application of international application no. PCT/EP2009/058236, filed Jul. 1, 2009. The entire disclosures of the above applications are incorporated herein by reference.

TECHNICAL FIELD

The present invention relates to the field of manufacturing containers made of a polymer material, especially a polyester. More particularly, it relates to the field of manufacturing polyester bottles, preferably polyethylene terephthalate (PET) bottles containing a liquid, preferably water and especially mineral water.

BACKGROUND

For many years, the PET bottles usually found on the market have been manufactured by the blow molding or stretch-blow molding of PET preforms using compressed air.

A preform usually takes the form of a cylindrical tube closed at one of its ends and open at its opposite end. The open head of the preform corresponds to the neck of the container. During the conventional process for manufacturing containers from preforms, the preforms are slipped onto the cylindrical mounts of a continuous conveyor chain, which thus transports the preforms through an oven, essentially formed by a straight section bordered on each side by radiative heating means, so as to temperature-condition the plastic for the subsequent stretch-blow molding step.

The hot preform is then taken off and transported into a mold of a blow molding machine. The transport movement, performed for example by a transfer arm, is coordinated with that of the blow molding machine, which is generally produced in the form of a rotary carousel that rotates continuously about its vertical axis and carries, on its periphery, a series of identical molds. Thus, the preform is placed in the mold immediately after it has been opened and the previously formed container has been removed.

The preform is heated beforehand so as to be in the mold at a temperature above the glass transition temperature (about 100° C.) so as to enable it to be formed by stretch-blow molding. The temperature of the preform at the end of the heating step is slightly above that required inside the mold of the blow molding machine, so as to take into account the cooling that takes place over the distance that exists between the heating site and the blow-molding site. Thanks to the simultaneous presence of several molds, such a blow molding machine can produce containers at very high rates, of around 1000 to 2000 bottles per hour per mold, i.e. around several tens of thousands of units per hour.

The stretch-blow molding takes place by stretching using a metal rod and by injecting air at pressures ranging from 3 to 40 bar ($3.10^5$ Pa to $4.10^6$ Pa). The air is injected through a nozzle, the end of which is introduced through the opening in the head of the preform.

In general, the pressures then exerted on the injected beverage are high, since the industrial process requires high rates. The usual practice is for the volume of beverage introduced into the containers to be above the displayed volume for the container, in so far as it is possible to finalize the contents with a volume greater than the stipulated volume, whereas the reverse is not possible.

However, such a situation is hardly satisfactory as there is consequently a loss of food product for the manufacturer, and also a lack of precision in the match between the contained volume value and the reality of this volume, bottle by bottle.

SUMMARY

Within this context, the technical problem solved by the present invention is to devise an industrial process that guarantees the stipulated volume for the type of filling, in a simple and economically acceptable manner.

For this purpose, the Applicant proposes a method of delivering a predetermined volume of a beverage component into a thermoplastic container formed from a heated preform (for example an approximately cylindrical preform) positioned in a mold, the method including a step of injecting at least some beverage component into a recess in the preform so as to promote expansion of the preform inside the mold, the mold defining the shape of the container, a volume of beverage component introduced during the injection step being at least equal to said predetermined volume, and, in addition, the method includes a step of sucking out a fraction of said volume of beverage component introduced until the volume of beverage component remaining in the container is approximately equal to said predetermined volume.

The method thus defined makes it possible to guarantee the intended volume for the type of container defined by the mold within the context of an integrated industrial process.

The suction step is preferably carried out by means of a suction pump and a volumetric sensor. The injection step is preferably carried out by means of a pressurizing actuator and a volumetric sensor.

Preferably, the injection step includes a substep of longitudinally stretching the preform by a stretch rod, said stretch rod being hollow, and the suction step comprises sucking out some of the beverage via said hollow stretch rod.

This has the advantage that the method is implemented in an integrated manner.

Advantageously, the method includes a step of recirculating at least part of the beverage sucked out during the suction step.

The recirculation may be performed in the injection circuit, thereby minimizing beverage losses.

According to one embodiment, provision is also made for the suction step to comprise suction by means of a vacuum pump.

Advantageously, the injection step includes a sub-step of injecting at least some beverage via a hollow stretch rod that is designed to stretch a thermoplastic preform and is connected to a beverage inlet.

According to a preferred feature, the same stretch rod serves for injecting beverage and for sucking out a fraction of said volume of beverage.

According to one feature, which may be combined with the previous ones, the hollow stretch rod has an adapted profile in order to minimize the turbulence in the beverage during the step of injecting at least some beverage via the hollowing stretch rod.

Said profile may include an internal profile, an external profile or a combination of an internal profile and an external profile. A person skilled in the art will appreciate that the characteristics of the surfaces are adapted, and they prevent the formation of turbulence.

The beverage is injected in amounts of about 500 ml in 0.2 s. The adapted profile minimizes the turbulence, thereby making it possible to obtain a more stable process, with wider operational windows.

Preferably, the injection is carried out by means of a bell-shaped filling head.

This makes it possible to reduce the risks of the thermoplastic container necks rupturing, since they are subjected to high pressures during the injection step.

According to one advantageous aspect, the stretch rod is designed in such a way that its internal volume is optimized so that said fraction of the beverage volume is reduced.

Preferably, the fraction of the beverage volume is reduced to the internal volume of the neck.

According to one embodiment, the injection step includes a step of injecting at least some beverage through the inside of the stretch rod and through an orifice around the stretch rod.

Indeed, it is also advantageous for the injection step to comprise a step of injecting a first beverage component and a step of injecting a second beverage component. Under these circumstances, which have a particular advantage from the industrial standpoint, it is only in the bottle that the final preparation of the beverage can take place.

Most particularly advantageous is the solution whereby the injection of the first beverage component comprises injection through the inside of the stretch rod and the injection of the second beverage component comprises injection through an orifice around the stretch rod.

The invention also relates to a device for delivering a predetermined volume of beverage into a thermoplastic container formed from an approximately cylindrical heated preform positioned in a mold, characterized in that the device comprises means for injecting at least some beverage into a recess in the preform so as to promote expansion of the preform inside the mold, the mold defining the shape of the container, a volume of beverage introduced during the injection step being at least equal to said predetermined volume and the device comprising, in addition, means for sucking out a fraction of said volume of beverage component introduced until the volume of beverage remaining in the container is approximately equal to said predetermined volume.

Advantageously, this device may include means suitable for carrying out the respective intended steps of the method, taken separately or in combination.

BRIEF DESCRIPTION OF THE DRAWINGS

The invention will now be described in detail with reference to the appended figures, which relate to exemplary embodiments.

DETAILED DESCRIPTION

The embodiment given here by way of example relates to a process for manufacturing PET mineral water bottles from a heated preform. The preform has the shape of a cylindrical tube closed at its lower end. The open head of the preform corresponds to the throat or neck of the bottle, onto which a closure cap is screwed.

Figure 1:
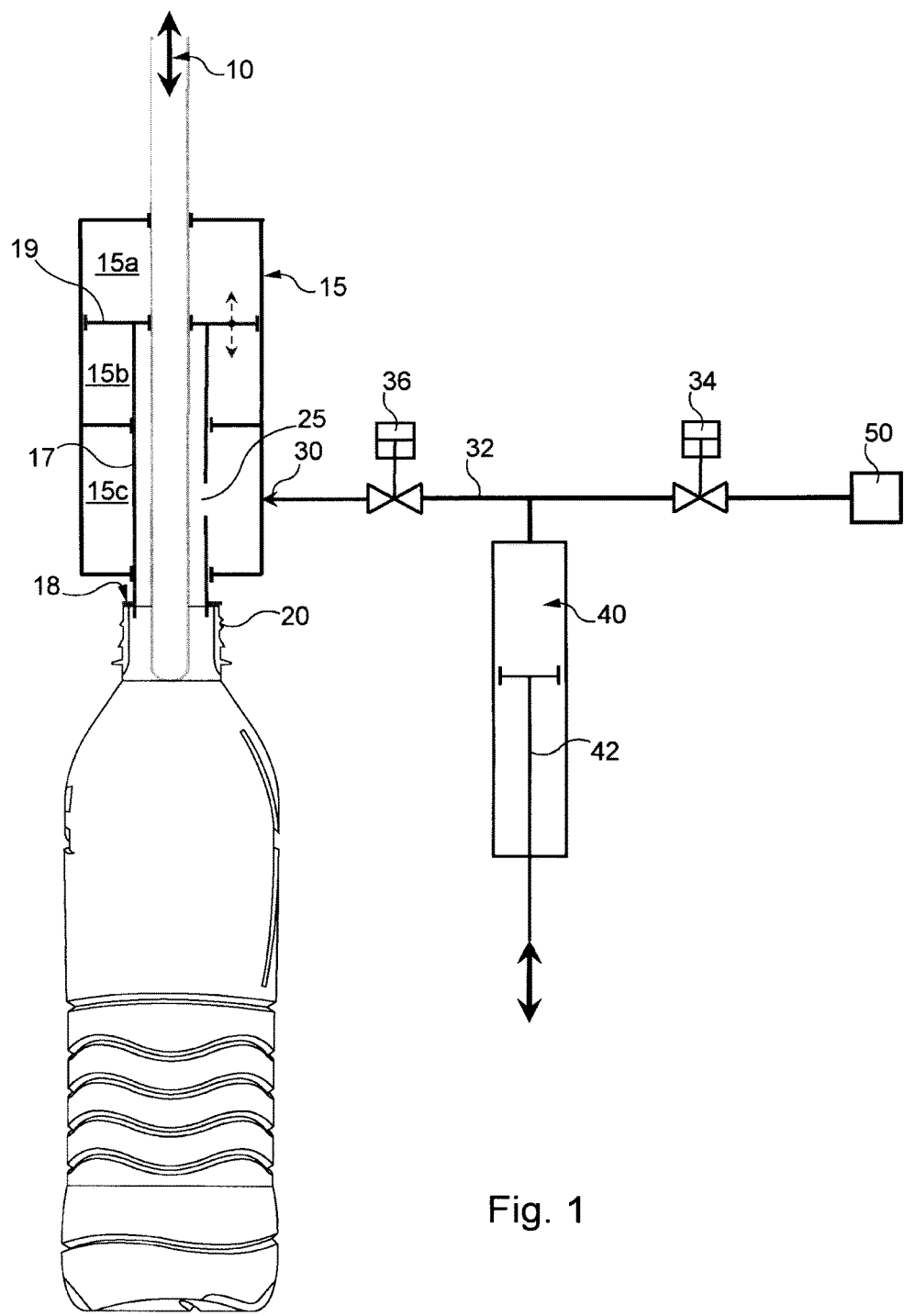
FIG. 1 shows a general diagram of an installation suitable for operating with the invention.

Referring to FIG. 1, a stretch rod 10 is inserted into a compressed-air actuator 15. The stretch rod 10 is generally controlled by an air actuator associated with a cam, which gives it a longitudinal movement (represented by an arrow). It is also possible to use a stretch motor.

The compressed-air actuator 15 comprises a control cylinder 17 controlling an injection head 18, through which the stretch rod 10 passes. The injection head 18 is connected to the neck 20 of a PET preform placed in a mold (not shown), which preform, after being expanded, takes on the shape of a mineral water bottle, this shape being determined by the wall of the mold.

The actuator 15 comprises three chambers, the upper two chambers 15a and 15b being filled with compressed air. Between these upper two chambers 15a, 15b, a piston wall 19 slides in a direction parallel to the stretch rod (the displacement being represented by an arrow). The stretch rod 10 passes through the center of this wall 19.

The compressed-air actuator also includes a lateral inlet 30 for the beverage, here mineral water, connected to a third chamber 15c of the actuator, this being the bottom chamber. The beverage is fed in via a line 32.

An external mineral water inlet feeds the liquid via the remote end of this line 32 into a first valve 34, which is connected to the opening of a single-chamber filling cylinder 40 comprising a piston 42 controlled by a filling motor (movement of which is represented by an arrow). This motor imparts a longitudinal movement on the piston in the single chamber of the filling cylinder 40.

On the line 32 there is a second valve 36, which is in series behind the first valve 34 and the opening of the filling cylinder 40. The line 32 then runs into the bottom chamber 15c of the compressed-air actuator 15.

The bottom chamber 15c of the compressed-air actuator is penetrated by the control cylinder 17, which controls the filling head 18, the internal volume of which emerges through the lower outlet of the compressed-air actuator 15 and through the filling head 18. The control cylinder has a lateral opening 25 allowing the beverage to circulate between the bottom chamber 15c of the actuator 15 and the inside of the control cylinder 17.

The stretch rod 10 itself passes through the control cylinder 17 as far as the filling head 18 and the neck 20 of the bottle preform.

Figure 2:
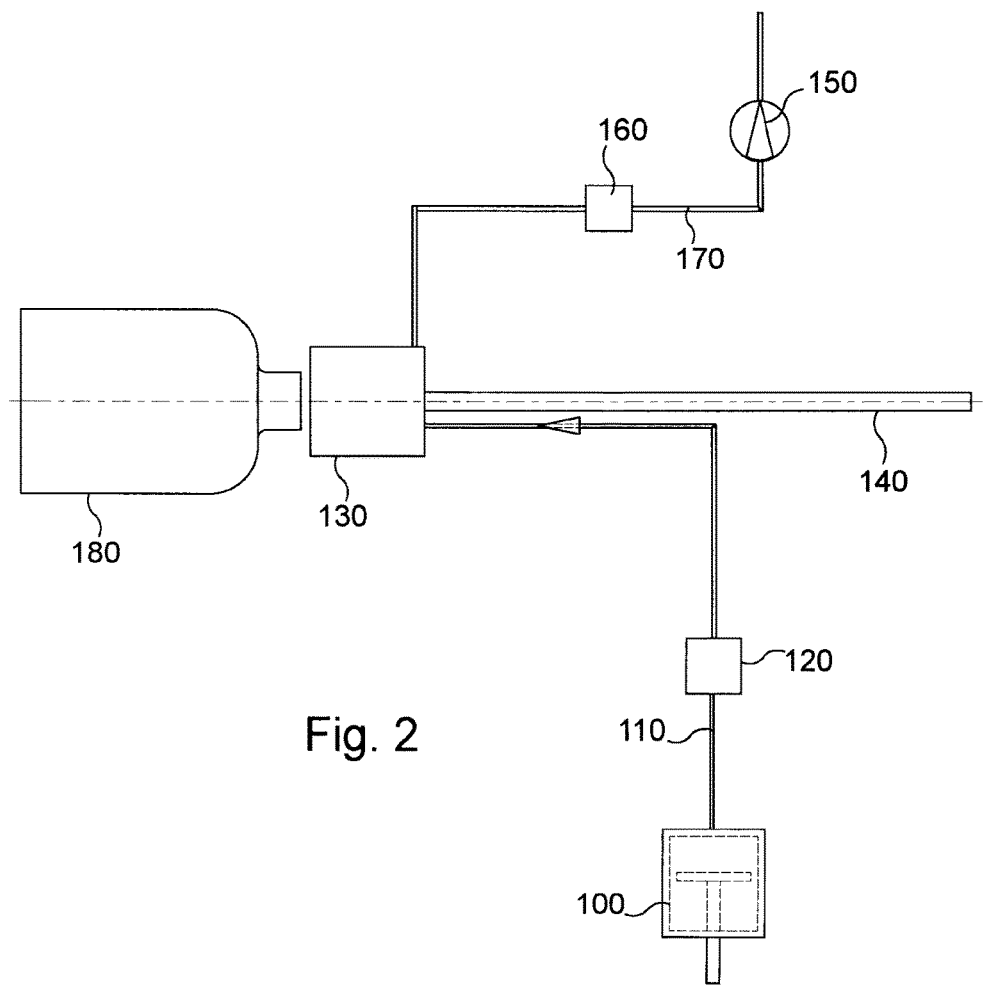
FIG. 2 is a schematic diagram of another installation embodying the principles of the present invention.

Referring to FIG. 2, showing an alternative embodiment, a pressurizing actuator 100 increases the pressure of the beverage in the beverage feed line 110. A volumetric sensor 120 allows the volume injected through the line 110 to be monitored. The beverage is introduced into the nozzle 130 through the line 110.

The stretch rod 140 is introduced along the axis of the nozzle 130.

A suction pump 150 is attached to a line 170 connected via a volumetric sensor 160 to the nozzle 130.

The nozzle 130 is positioned facing the mold (not shown) in which the PET preform, to be expanded and filled with beverage, here mineral water, is positioned. After the expansion phase, a PET water bottle 180 is formed.

Figure 3:
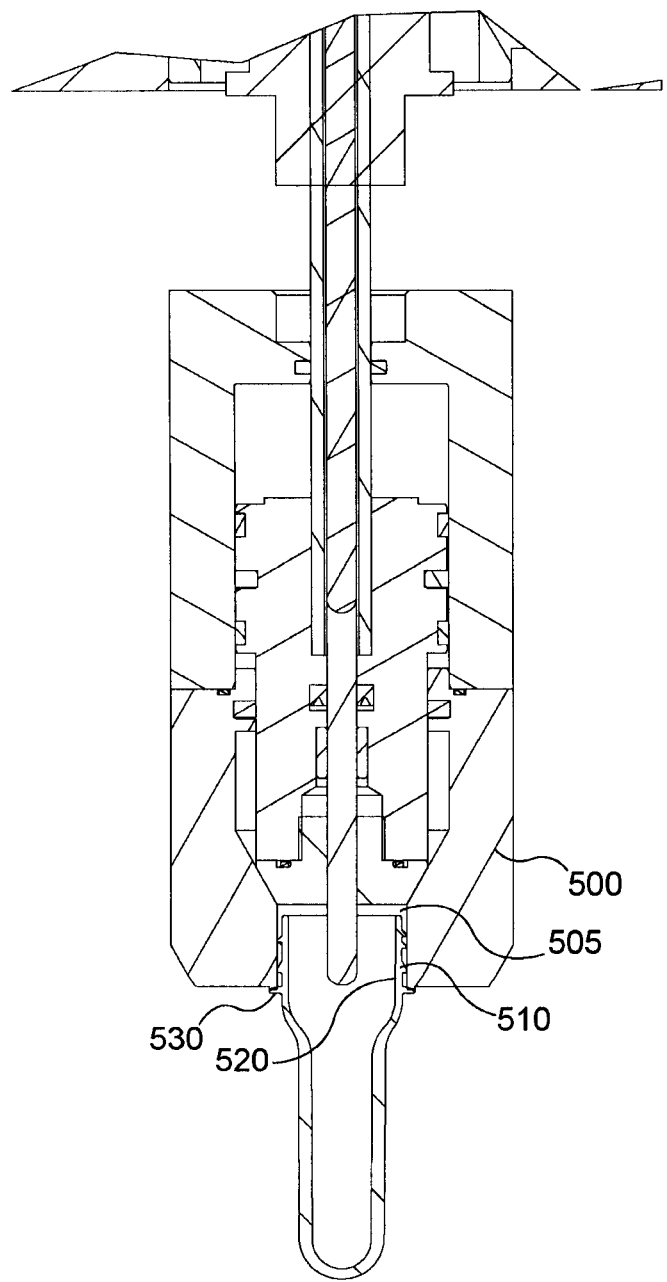
FIG. 3 shows a bell-shaped nozzle end-piece used within the context of the invention.

Referring to FIG. 3, a bell-shaped nozzle end-piece 500 according to a preferred embodiment is shown. The internal and external pressures on either side of the circumference of the neck of the preform (i.e. on the external surfaces 510 of the neck and on the internal surfaces 520 of the neck) are identical, owing to the presence of a passage 505 connecting the volumes on either side of the circumference, inside the nozzle. During filling, sealing is provided by the flange 530 on the preform. Thanks to this device, there is no risk of the neck of the preform deforming while a pressurized fluid is being injected by the nozzle.

According to another embodiment, a nozzle end-piece holds the external surfaces 510 of the neck of the preform in such a way that when a pressurized fluid is injected via the top of the nozzle into the recess of the preform, the pressure exerted on the internal walls 520 of the neck of the preform by the fluid is compensated for by the holding by the walls of the bell-shaped nozzle end-piece. The neck of the preform therefore does not deform, despite the high pressure.

Figure 4:
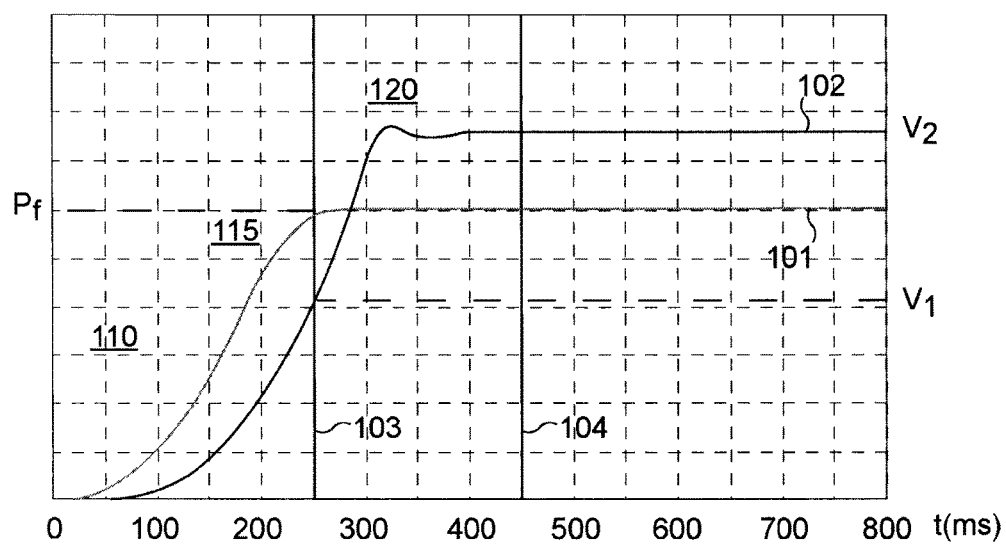
FIG. 4 shows the monitoring of the formation of a mineral water bottle according to one example of the use of the invention.

FIG. 4 shows the variation over time of the position 101 of the stretch rod and the position 102 of the filling actuator controlling the inflow of the mineral water into the expanded preform.

The horizontal axis represents the time, the left-hand vertical axis represents the position of the stretch rod and the right-hand vertical axis represents the volume of water introduced into the expanded preform, this being proportional to the position of the filling actuator.

During a first part of the process, from 0 to 250 ms, the stretch rod advances at an essentially constant rate, according to a preferred embodiment. However, according to another embodiment, during a first phase 110 of the process, in particular from 0 to 150 ms, the stretch rod advances at an increasing speed due to a positive acceleration. During a second phase 115 of the process, from 150 ms to 250 ms, the stretch rod advances with a negative acceleration, the speed decreasing until it becomes zero at 250 ms. However, it will be understood that the changes in speed must be sufficiently gentle to ensure regular and reliable stretching of the thermoplastic.

250 ms after the start of the process (reference 103), the stretch rod has reached its final position $P_f$, from which it no longer moves.

At the same instant, the filling actuator has introduced a volume $V_1$ of mineral water into the expanded preform. The volume introduced from the start of the process (therefore between 0 ms and 250 ms) has progressively increased, with a progressive increase in the flow rate (filling actuator displacement acceleration).

During the moments that follow, which constitute a third phase 120 of the process, up to 320 ms, the total volume of water introduced is constant, the flow rate being invariant. Next, the volume suddenly decreases by a small fraction (around 4%) over a period of 40 ms.

From this instant on, the total volume introduced stabilizes around the value V2, which is finally reached after a few oscillations, the flow rate of liquid being introduced being zero.

A few instants later, starting from 450 ms after the start of the process (reference 104), the filling actuator has reached a final position, from which it no longer moves. At this moment, it has introduced a volume V2 of mineral water into the expanded preform. The volume V2 is greater than $V_1$, but less than twice the volume $V_1$.

During the method of using the device described, the temperature of the preform is brought beforehand to a value between 50° C. and 130° C., or even between 75° C. and 100° C. In the preferred embodiment, this value is 95° C., the plastic used being PET.

The rod has a speed of between 0.5 and 3.0 m/s$^{-1}$, or even between 1.0 and 5 m/s$^{-1}$. In the preferred embodiment, this value is 1.6 m/s$^{-1}$.

The temperature of the beverage is brought beforehand to a value 25 between 1° C. and 120° C., preferably between 10° C. and 90° C. In the preferred embodiment, this value is 30° C.

The longitudinal stretch ratio of the thermoplastic is between 2 and 5 or even between 2.5 and 4. In the preferred embodiment, this value is 3.5.

The radial stretch ratio of the thermoplastic is between 2 and 7, or even between 3 and 4.5. In the preferred embodiment, this value is 4.

The thermoplastic is chosen from the group consisting of polyethylene terephthalates, polypropylenes, polyethylenes, polycarbonates, polystyrenes, polylactic acids, polyvinyl chlorides and combinations thereof. In the preferred embodiment, it is PET.

The temperature of the mold is at least 50° C. below the melting point of the thermoplastic, which in the case of PET is 230° C. Preferably, this 5 temperature is maintained below 100° C. In the preferred embodiment, the temperature of the mold is equal to the ambient temperature.

Of course, the invention is not limited to the embodiments described and illustrated by the appended drawings; rather it extends to all variants that can be envisaged by a person skilled in the art within the scope of the claims.

The invention claimed is:

1. An apparatus for forming a thermoplastic container from a heated cylindrical preform and for delivering a predetermined volume of a beverage component into the container, the apparatus comprising:
   a mold defining a shape of the container;
   an injection device configured to inject at least one beverage component into a recess in the preform so as to promote expansion of the preform inside the mold into the shape of the container, the injection device being further configured to inject the at least one beverage component in a first volume intentionally greater than the predetermined volume;
   the injection device including a nozzle coupled to an actuator configured to pressurize and provide the beverage component; and
   a suction device independent of the actuator, the suction device being coupled to the nozzle and configured to withdrawal and remove a fraction of the first volume of the beverage component until a second volume of beverage component remaining in the container is equal to the predetermined volume.

2. The apparatus according to claim 1, wherein the suction device is a suction pump.

3. The apparatus according to claim 1, wherein the actuator includes a filling cylinder and piston.

4. The apparatus according to claim 1, wherein the suction device is a suction pump.

5. The apparatus according to claim 1, further comprising a stretch rod coupled to and extending through the nozzle, the stretch rod being moveable between extended and retracted positions.

6. The apparatus according to claim 5, wherein the stretch rod is hollow.

7. The apparatus according to claim 6, further comprising a suction device configured to withdrawal the fraction of the first volume of the beverage component through the stretch rod.

8. The apparatus according to claim 7, wherein the suction device is a suction pump.

9. The apparatus according to claim 5, wherein the stretch rod is coupled to an actuator configured to pressurize and provide the beverage component through the stretch rod.

10. The apparatus according to claim 9, wherein the actuator includes a filling cylinder and piston.

11. The apparatus according to claim 6, wherein the stretch rod has an internal profile configured to minimize turbulence of the beverage component during injection through the stretch rod.

12. The apparatus according to claim 6, wherein a first injection path for the beverage component is defined through the stretch rod and a second injection path is defined about the stretch rod, the second injection path being for one of the beverage component or a second beverage component.

13. The apparatus according to claim 5, wherein an injection path for the beverage component is defined about the stretch rod and the stretch rod has an external profile configured to minimize turbulence of the beverage component during injection of the beverage component.

14. An apparatus for forming a thermoplastic container from a heated cylindrical preform and for delivering a predetermined volume of a beverage component into the container, the apparatus comprising:
  a mold defining a shape of the container;
  a nozzle coupled to an injection device configured to inject at least one beverage component into a recess in the preform so as to promote expansion of the preform inside the mold into the shape of the container, the nozzle and injection device being further configured to inject the at least one beverage component in a first volume intentionally greater than the predetermined volume; and
  the nozzle also coupled to a suction device, distinct from the injection device, configured to remove a fraction of the first volume of the beverage component until a second volume of beverage component remaining in the container is equal to the predetermined volume.

* * * * *